(12) United States Patent
Yeh

(10) Patent No.: US 7,228,985 B2
(45) Date of Patent: Jun. 12, 2007

(54) CARRYING APPARATUS

(76) Inventor: Jen-Ren Yeh, No. 15, Lane 175, Section 3, Chang Mei Road, Ho Mei Town, Chang Hua Hsien (TW)

( * ) Notice: Subject to any disclaimer, the term of this patent is extended or adjusted under 35 U.S.C. 154(b) by 333 days.

(21) Appl. No.: 10/804,971

(22) Filed: Mar. 18, 2004

(65) Prior Publication Data

US 2005/0205578 A1    Sep. 22, 2005

(51) Int. Cl.
*B65D 6/08* (2006.01)
(52) U.S. Cl. ............... 220/485; 220/494; 220/495; 220/493
(58) Field of Classification Search ......... 220/485, 220/494, 620, 640–642, 493
See application file for complete search history.

(56) References Cited

U.S. PATENT DOCUMENTS

| | | | | |
|---|---|---|---|---|
| 1,493,376 A | * | 5/1924 | Nelson | 220/620 |
| 2,598,962 A | * | 6/1952 | Anseele | 220/616 |
| 3,302,825 A | * | 2/1967 | Schleeweiss | 220/611 |
| 3,800,994 A | * | 4/1974 | Bowen et al. | 229/117.29 |
| D267,395 S | * | 12/1982 | Groenewold et al. | D9/425 |
| 4,664,285 A | * | 5/1987 | Korcz et al. | 220/613 |
| D298,403 S | * | 11/1988 | Hagberg et al. | D7/388 |
| D373,039 S | * | 8/1996 | Cohen et al. | D6/566 |
| 5,697,514 A | * | 12/1997 | Hekal | 220/359.1 |
| D419,302 S | * | 1/2000 | Hardy et al. | D3/306 |
| D431,907 S | * | 10/2000 | Andujar et al. | D3/306 |
| D433,709 S | * | 11/2000 | Hardy | D19/75 |
| D434,074 S | * | 11/2000 | Hardy | D19/75 |
| 6,165,115 A | * | 12/2000 | Rea | 493/109 |
| D437,984 S | * | 2/2001 | Weiss et al. | D34/1 |
| D449,074 S | * | 10/2001 | Andujar | D19/75 |
| D450,453 S | * | 11/2001 | Andujar | D3/306 |
| D450,481 S | * | 11/2001 | Post | D6/465 |
| D451,675 S | * | 12/2001 | Hardy et al. | D3/306 |
| D453,027 S | * | 1/2002 | Andujar | D19/90 |
| 6,718,635 B2 | * | 4/2004 | Cheng et al. | 29/896.6 |
| D526,754 S | * | 8/2006 | Hardy et al. | D32/37 |
| D530,517 S | * | 10/2006 | Hardy et al. | D3/306 |
| 2003/0102315 A1 | * | 6/2003 | Cheng et al. | 220/485 |
| 2003/0136786 A1 | * | 7/2003 | Cheng et al. | 220/485 |
| 2005/0077299 A1 | * | 4/2005 | Cheng et al. | 220/485 |

* cited by examiner

*Primary Examiner*—Anthony Stashick
*Assistant Examiner*—Chris McKinley
(74) *Attorney, Agent, or Firm*—Alan Kamrath; Kamrath & Associates P.A.

(57) ABSTRACT

A carrying apparatus includes a metal basket and a metal frame. The metal basket includes a bottom and a wall attached to the bottom. The wall includes an upper edge and a bent connection extending from the wall to the upper edge. The metal frame includes a vertical portion, a first horizontal portion, a bent connection extending from the vertical portion to the first horizontal portion, a second horizontal portion, a retroflex connection extending from the first horizontal portion to the second horizontal portion and a roiled edge extending from the second horizontal portion. The bent connection of the basket is clamped between the bent connection and the rolled edge of the frame. Therefore, the frame is secured to the basket.

4 Claims, 7 Drawing Sheets

CARRYING APPARATUS

FIELD OF INVENTION

The present invention relates to a basket including a carrying apparatus.

BACKGROUND OF INVENTION

Referring to FIGS. 6 and 7, a conventional carrying apparatus 60 includes a basket 62 made of metal and a frame 64 made of metal. The basket 62 is made of a metal net that is punched. The frame 64 is made of a metal strip that is punched. The frame 64 is secured to the basket 62 for rigidity of the basket 62 and safety of users. The basket 62 includes a wall 66, an edge 68 and a bent connection 70 extending from the wall 66 to the edge 68. The frame 64 includes a vertical portion 72, a first horizontal portion 74, a bent connection 76 extending from the vertical portion 72 to the first horizontal portion 74, a second horizontal portion 78, a retroflex connection 80 extending from the first horizontal portion 74 to the second horizontal portion 78, a bent edge 82 extending from the second horizontal portion 78. The edge 68 is put in a space defined between the first horizontal portion 74 and the second horizontal portion 78. The bent connection 70 is covered via the bent edge 82. The frame 64 is punched against the basket 62. Soldering is conducted between the vertical portion 72 and the wall 66. Thus, the frame 64 is secured to the basket 62. However, solder provided between the vertical portion 72 and the wall 66 is, of course, not esthetic. Moreover, while using the carrying apparatus 60, a user can easily have his or her fingers cut by the bent edge 82.

The present invention is therefore intended to obviate or at least alleviate the problems encountered in the prior art.

SUMMARY OF INVENTION

It is the primary objective of the present invention to provide a safe carrying apparatus that cannot cut a users' fingers.

According to the present invention, a carrying apparatus includes a metal basket and a metal frame. The metal basket includes a bottom and a wall attached to the bottom. The wall includes an upper edge and a bent connection extending from the wall to the upper edge. The metal frame includes a vertical portion, a first horizontal portion, a bent connection extending from the vertical portion to the first horizontal portion, a second horizontal portion, a retroflex connection extending from the first horizontal portion to the second horizontal portion, a rolled edge extending from the second horizontal portion. The bent connection of the basket is clamped between the bent connection and the rolled edge of the frame. Therefore, the frame is secured to the basket.

Other objectives, advantages and novel features of the invention will become more apparent from the following detailed description in conjunction with the attached drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
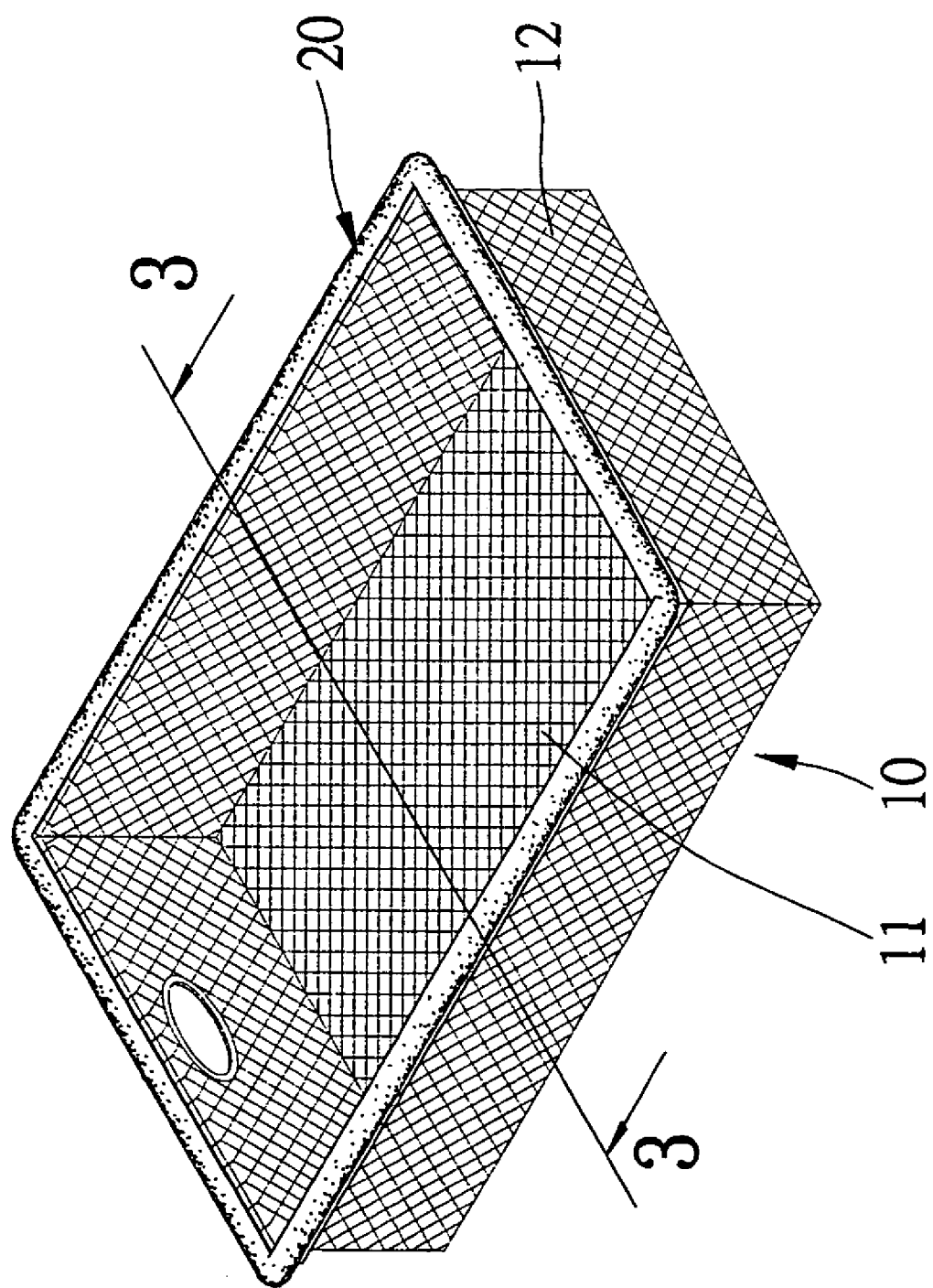
FIG. 1 is a perspective view of a carrying apparatus according to the preferred embodiment of the present invention.
Figure 2:
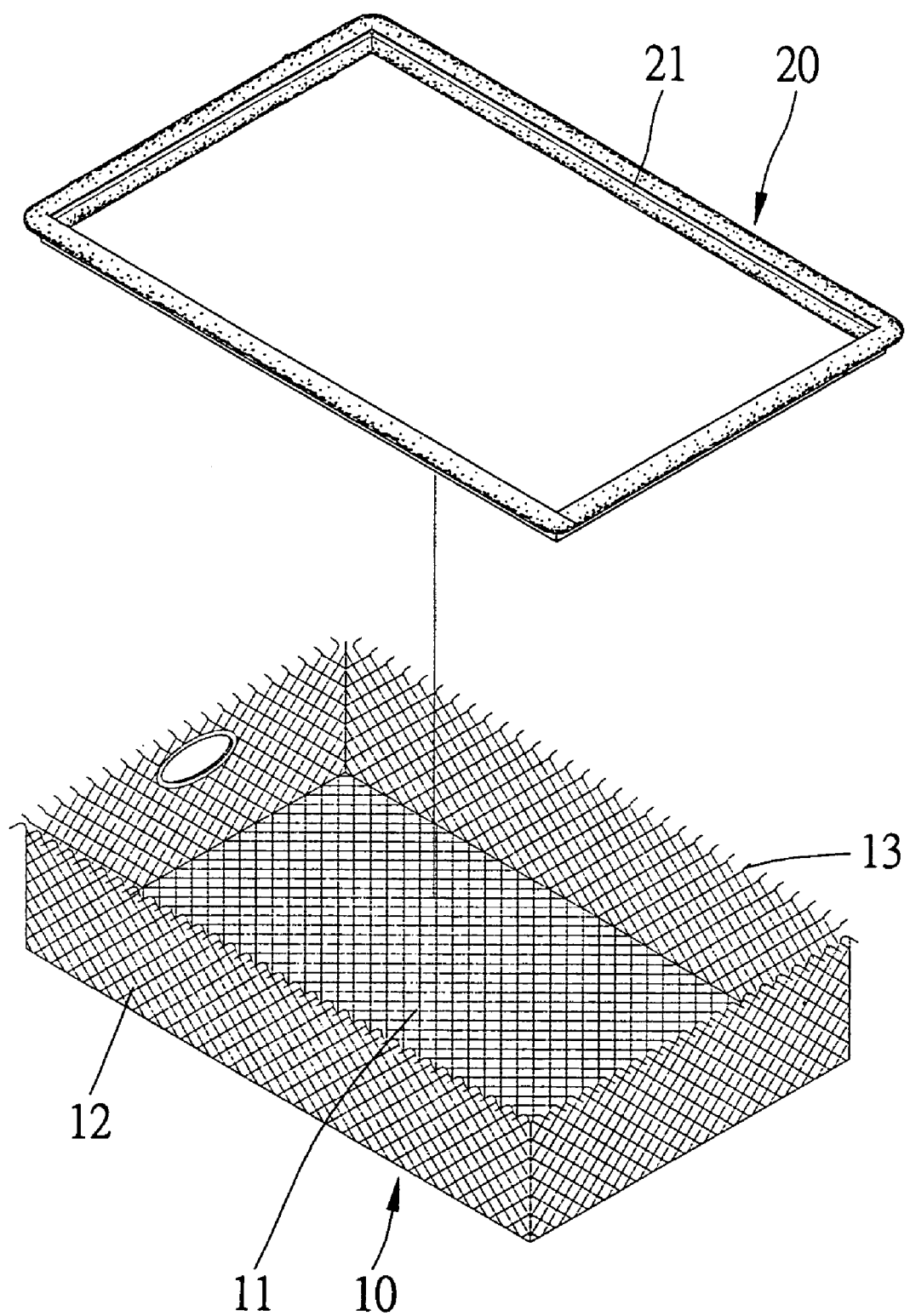
FIG. 2 is an exploded view of the carrying apparatus shown in FIG. 1.
Figure 3:
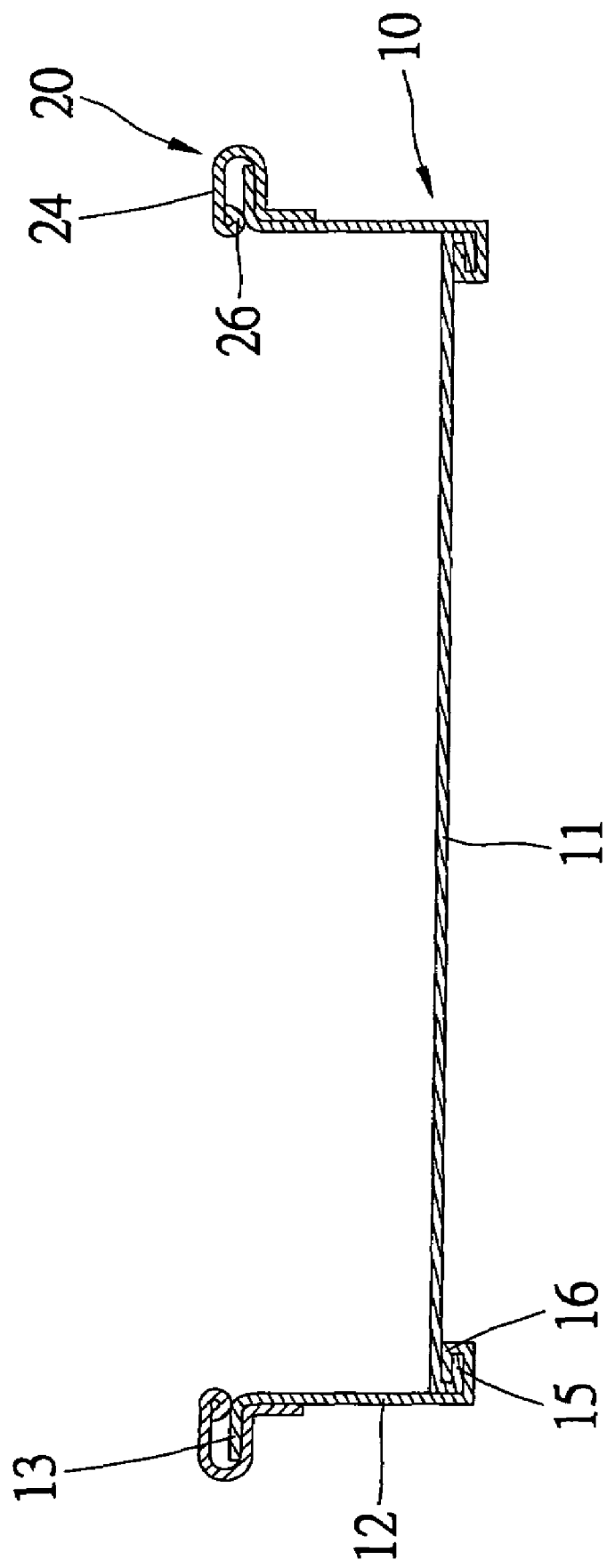
FIG. 3 is a cross-sectional view of the carrying apparatus taken along a line 3—3 in FIG. 1.
Figure 4:
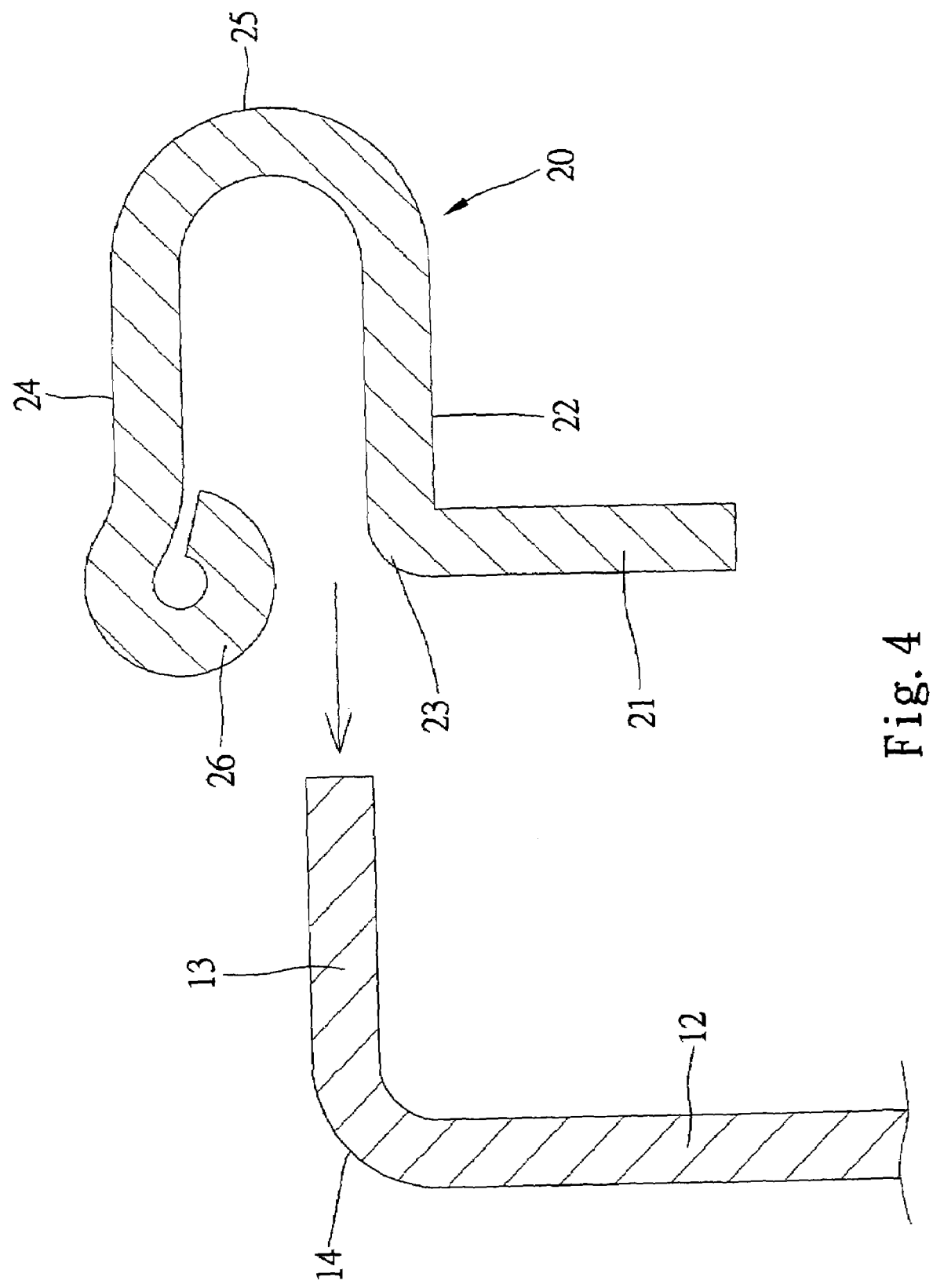
FIG. 4 is an enlarged, partial, cross-sectional view of the carrying apparatus shown in FIG. 2.

Referring to FIGS. 1 and 2, according to the preferred embodiment of the present invention, a carrying apparatus includes a basket 10 made of metal and a frame 20 made of metal. The basket 10 is made of a metal net that is punched. The frame 20 is made of a metal strip that is punched. The frame 20 is secured to the basket 10 for rigidity of the basket 10 and safety of users.

Referring to FIGS. 1–4, the basket 10 includes a bottom 11 and a wall 12. The bottom 11 includes an edge 15 extending downwards and inwards. The wall 12 includes a lower edge 16 extending inwards, upwards and outwards. The edge 15 of the bottom 11 is hooked to the lower edge 16 of the wall 12 so as to form the basket 10. The wall 12 includes an upper edge 13 extending outwards so as to form a bent connection 14.

The frame 20 includes a vertical portion 21, a first horizontal portion 22, a bent connection 23 extending from the vertical portion 21 to the first horizontal portion 22, a second horizontal portion 24, a retroflex connection 25 extending from the first horizontal portion 22 to the second horizontal portion 24, and a rolled edge 26 extending from the second horizontal portion 24.

Figure 5:
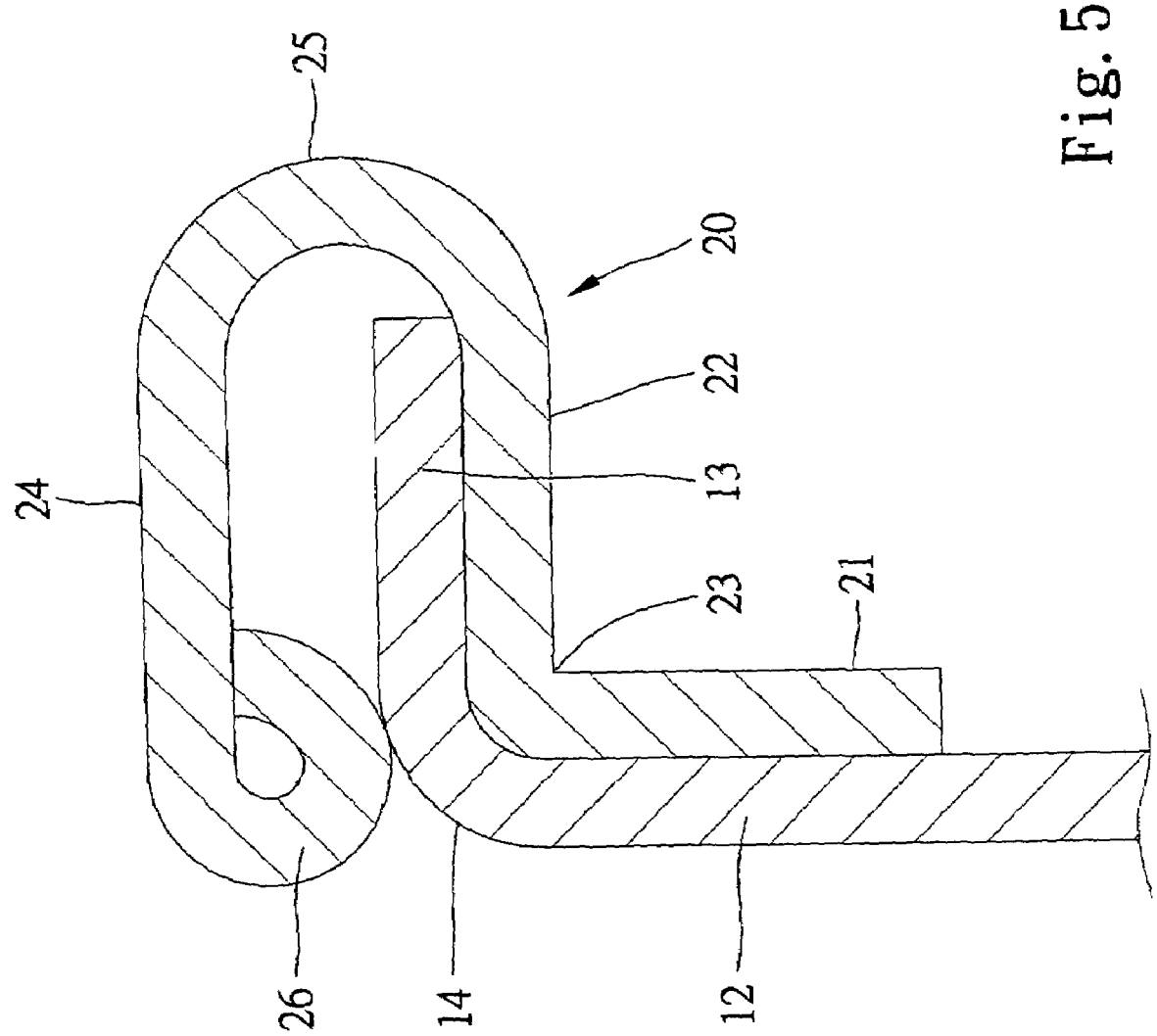
FIG. 5 is similar to FIG. 4 but shows a frame detached from a basket.
Figure 6:
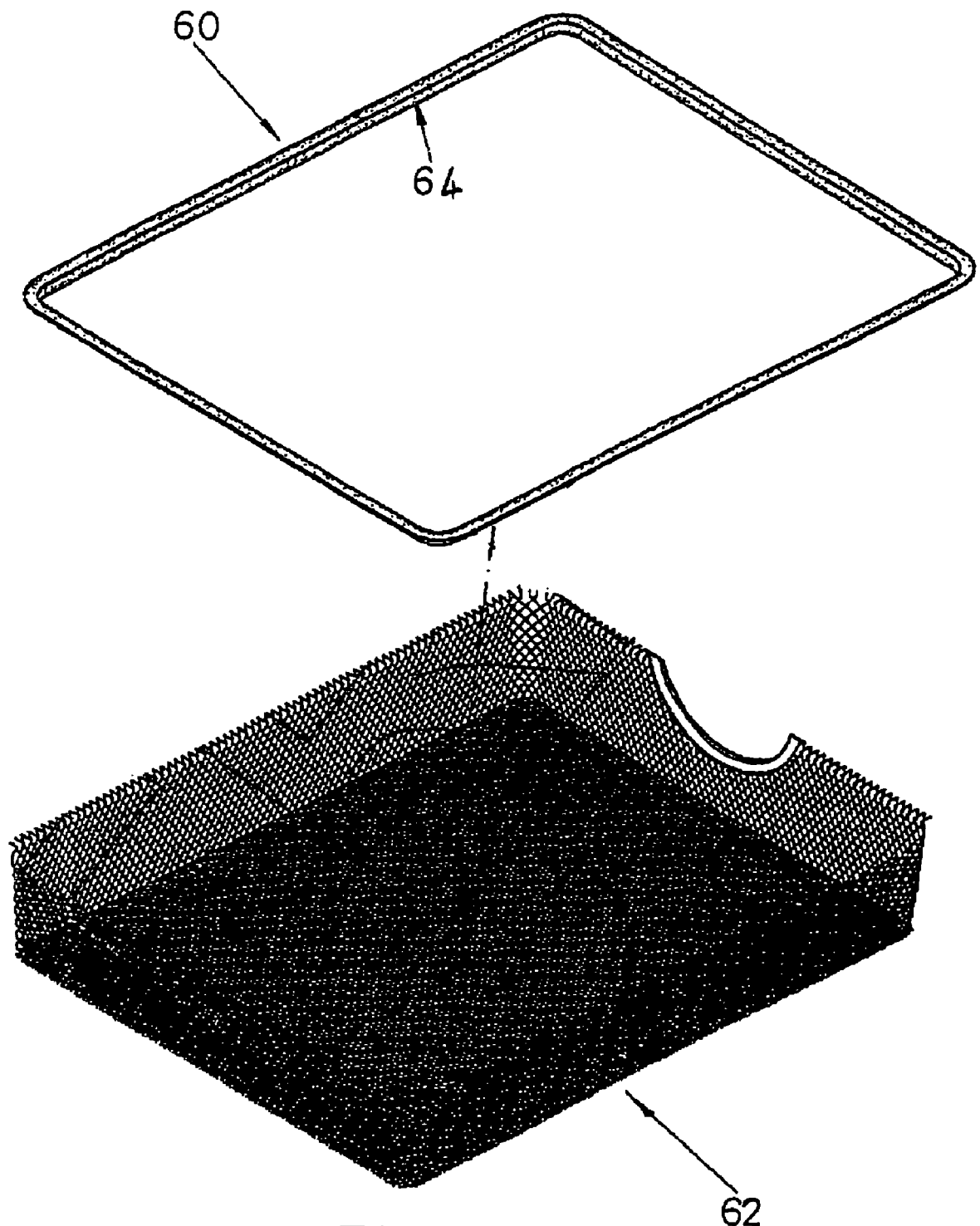
FIG. 6 is an exploded view of a conventional carrying apparatus.
Figure 7:
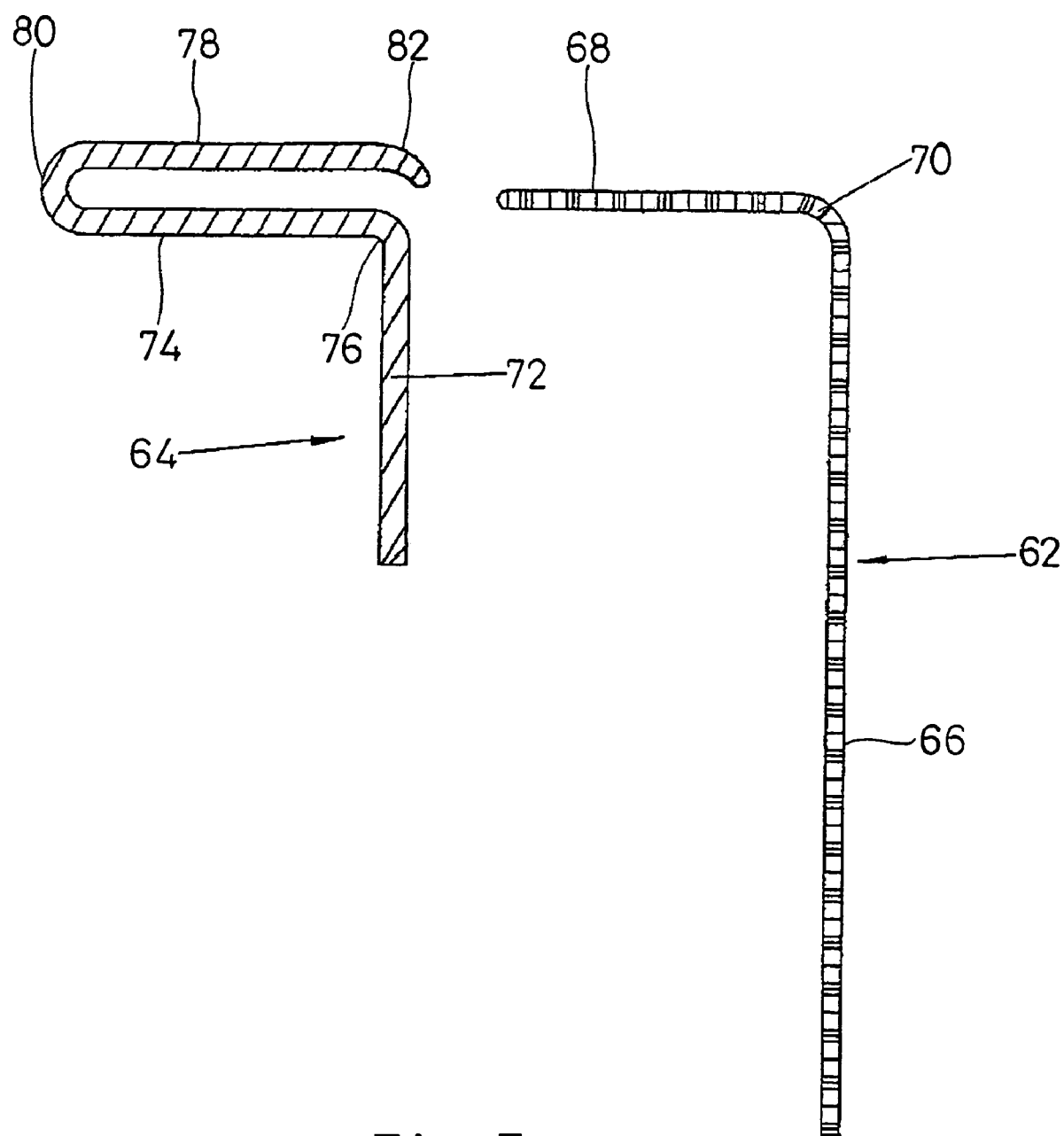
FIG. 7 is an enlarged, partial, cross-sectional view of the conventional carrying apparatus shown in FIG. 6.

Referring to FIG. 5, the upper edge 13 is put between the first horizontal portion 22 and the second horizontal portion 24. The bent connection 14 is put between the bent connection 23 and the rolled edge 26. The wall 12 is put against the vertical portion 21. The frame 20 is punched against the basket 10 so that the bent connection 14 is clamped between the bent connection 23 and the rolled edge 26. Therefore, the frame 20 is secured to the basket 10.

Due to the elasticity of the rolled edge 26, the bent connection 14 is firmly clamped between the bent connection 23 and the rolled edge 26. Therefore, the frame 20 is secured to the basket 10, saving the soldering required in making the conventional carrying apparatus addressed in the Background of Invention. Moreover, the rolled edge 26 obviously cannot cut users' fingers.

The present invention has been described via detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A carrying apparatus comprising:
    a metal basket comprising a bottom and a wall attached to the bottom, wherein the wall includes an upper edge and a bent connection extending from the wall to the upper edge; and
    a metal frame comprising a vertical portion, a first horizontal portion, a bent connection extending from the vertical portion to the first horizontal portion, a second horizontal portion, a retroflex connection extending from the first horizontal portion to the second horizontal portion, and a rolled edge extending from the second horizontal portion, with the rolled edge integrally extending downward from the second horizontal portion toward the first horizontal portion, then inwards away from the retroflex connection parallel to the second horizontal section and then upwardly towards the second horizontal portion, wherein the rolled edge has circular cross sections, wherein the second horizontal portion and the rolling edge have first and second surfaces, with the rolled edge terminating in a free end extending between the first and second surfaces of the rolled body and abutting with the second surface of the second horizontal surface, wherein the bent connection of the basket is clamped between the bent connection and the rolled edge of the frame so that the frame is secured to the basket.

2. The carrying apparatus according to claim 1 wherein the bottom comprises an edge extending downwards and inwards, and the wall comprises a lower edge extending inwards, upwards and outwards for hooking the edge of the bottom.

3. The carrying apparatus according to claim 1 wherein the bottom of the basket is a net.

4. The carrying apparatus according to claim 1 wherein the wall of the basket is a net.

* * * * *